Patented Nov. 22, 1949

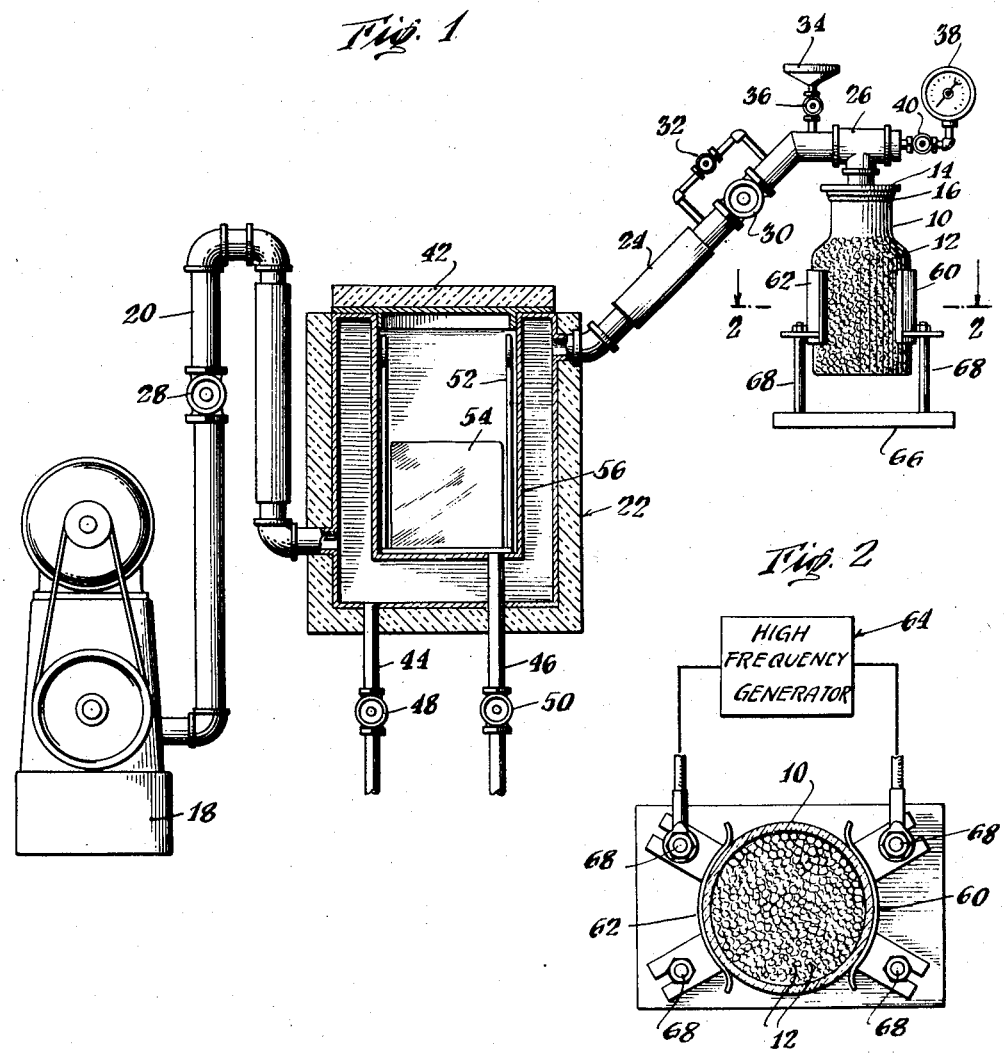

2,488,839

UNITED STATES PATENT OFFICE 2,488,839

PROCESS FOR DRYING SELENIUM WITH HIGH-FREQUENCY ELECTRIC CURRENT

George R. Walter and Norman P. Kemp, Baltimore, Md., assignors to American Smelting and Refining Company, New York, N. Y., a corporation of New Jersey Application October 4, 1945, Serial No. 620,230

1 Claim. (Cl. 34—1)

This invention relates to the art of producing selenium and more particularly to the drying of high purity selenium pellets.

Because of the considerable market demands for high purity selenium in pellet form, it is common practice to cast molten high purity selenium into distilled water to produce pellets of the size desired by the trade. While this procedure readily yields the selenium in pellets of the desired size, say, from 1 to 3 millimeters in diameter, the drying of the pellets to remove moisture without contamination of the product has heretofore presented a problem of considerable difficulty.

The present invention provides a process by which the pellets may be readily dried without in any way altering the physical or chemical properties of the pellets as cast.

Although the novel features which are believed to be characteristic of this invention will be particularly pointed out in the claim appended hereto, the invention itself, as to its objects and advantages, and the manner in which it may be carried out, may be better understood by referring to the following description taken in connection with the accompanying drawings forming a part thereof, in which Fig. 1 is a view, particularly in section, of an apparatus for practicing the process of the invention, and Fig. 2 is a cross sectional view taken on the line 2—2 of Fig. 1.

Like reference characters denote like parts in the several figures of the drawings.

Referring to the drawings, 10 indicates a glass bottle containing the high purity selenium pellets 12 to be dried, the bottle being provided with a vacuum seal consisting of a stainless steel plate 14 to which is cemented a thick rubber gasket 16. A pump 18 is connected by pipe 20 to condenser 22 and thence by pipe 24 to T-coupling 26 for providing a vacuum in container 10.

A valve 28 is provided in pipe 20 and a valve 30 is provided in pipe line 24 as is also a by-pass valve 32. Air filter 34 equipped with valve 36 is connected to line 24 on one side of T-coupling 26 while a pressure indicator gauge 38 having valve 40 is connected to the line on the other side of T-coupling 26.

The condenser 22 is provided with a removable closure 42, two drain lines 44 and 46 having valves 48 and 50, respectively. A removable tray 52 is provided for supporting a block of Dry Ice 54 in the space defined by wall 56 in the interior of condenser 22.

The container 10 is placed between electrodes 60, 62 which are connected to a high frequency generator generally designated by reference character 64, the container and electrodes being insulated from base 66 by supports 68.

Employing the apparatus shown, the invention may be practiced as follows: the container 10 may appropriately be a two gallon glass bottle containing say 30 pounds of high purity selenium pellets manufactured by pouring molten, high purity selenium into distilled water contained in the bottle. Excess water may be drained from the bottle, and a small amount of a polar compound, capable of increasing the dielectric loss of the moisture in the bottle over that of the selenium therein, added to the mass of pellets which are wet with residual water. This polar compound is preferably selenium dioxide as it serves to effect the desired increase in dielectric loss without contaminating the pellets. Satisfactory results have been obtained employing only approximately 0.15% gram per liter of high purity selenium dioxide. Having positioned the bottle 10 between the electrodes 60, 62, the vacuum pump and the high frequency generator are turned on and the by-pass valve 32 opened sufficiently to hold the temperature within the bottle 10 below 35° C. thereby preventing fusing of the vitreous pellets and withdrawing the water vapor as rapidly as it is formed. At this stage of the operation the over-all power consumption of the generator drops off steadily and, when it begins to level off, the main valve 30 on the vacuum line between the condenser 22 and container 10 is opened, applying full vacuum. As the last traces of water evaporate, the temperature in the bottle 10 drops and the power is cut off automatically by reason of the over-load caused by the high ionization currents in the bottle at the very low pressure then obtained.

The selenium is dry when the pressure drops below the vapor pressure of water at the temperature inside the bottle at which time the valve 30 may be closed and valve 36 on air filter 34 opened, thereby restoring the pressure within the bottle of dried pellets to atmospheric.

In a specific instance when operating the generator at a frequency of 12.5 megacycles, and employing an original concentration of 0.15 gram per liter of selenious acid as the polar compound, 10.75 ounces of water were evaporated from a bottle charge yielding slightly over 30 pounds of dry, high purity selenium pellets. The temperature in the bottle was 26° C. when the operation was initiated, and did not exceed 34° C. during the operation. When drying was completed, the temperature was 15° C. Total elapsed time for complete drying was 46 minutes, the power dropping from 1,080 watts at the start of the operation to 580 watts at 39 minutes shortly following which it cut off.

It will thus be appreciated that the present invention provides a simple process for completely drying selenium without contamination of the product. While certain specific terms have been used in the specification and claim for purposes of description and illustration, it will be understood that they are to be interpreted, within the scope of the invention as broadly as the art reasonably permits.

What is claimed is:

The method of removing moisture from the surfaces of high purity selenium pellets which comprises placing a mass of the moist pellets under vacuum, and heating same by high frequency electric power in the presence of a small amount of selenious acid.

GEORGE R. WALTER.
NORMAN P. KEMP.

REFERENCES CITED

The following references are of record in the file of this patent:

UNITED STATES PATENTS

| Number | Name | Date |
| --- | --- | --- |
| 1,970,956 | Elser | Aug. 21, 1934 |
| 2,280,771 | Dufour et al. | Apr. 28, 1942 |
| 2,325,652 | Bierwirth | Aug. 3, 1943 |
| 2,360,108 | Christie | Oct. 10, 1944 |
| 2,364,790 | Hemming | Dec. 12, 1944 |